Patented June 19, 1923.

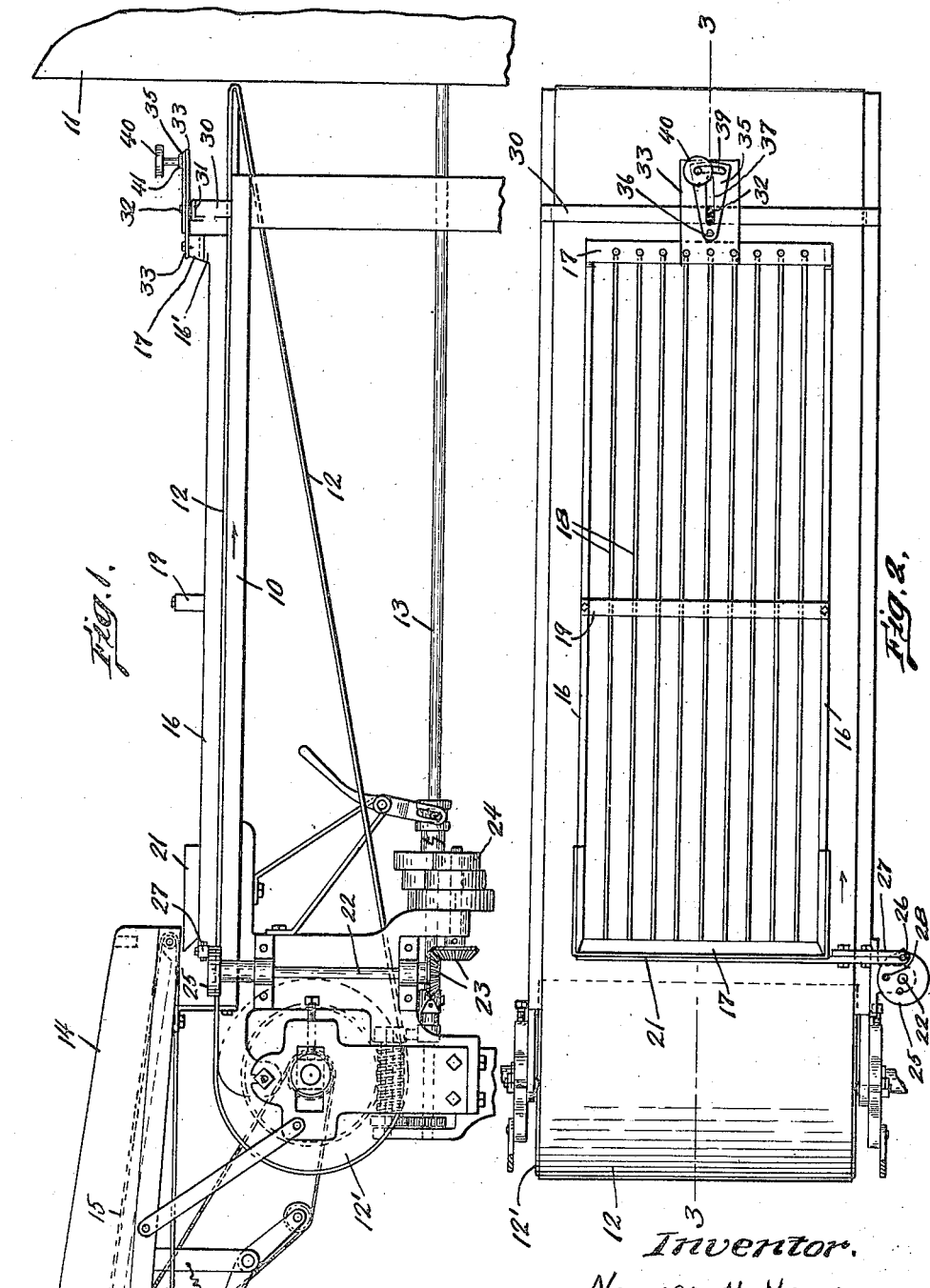

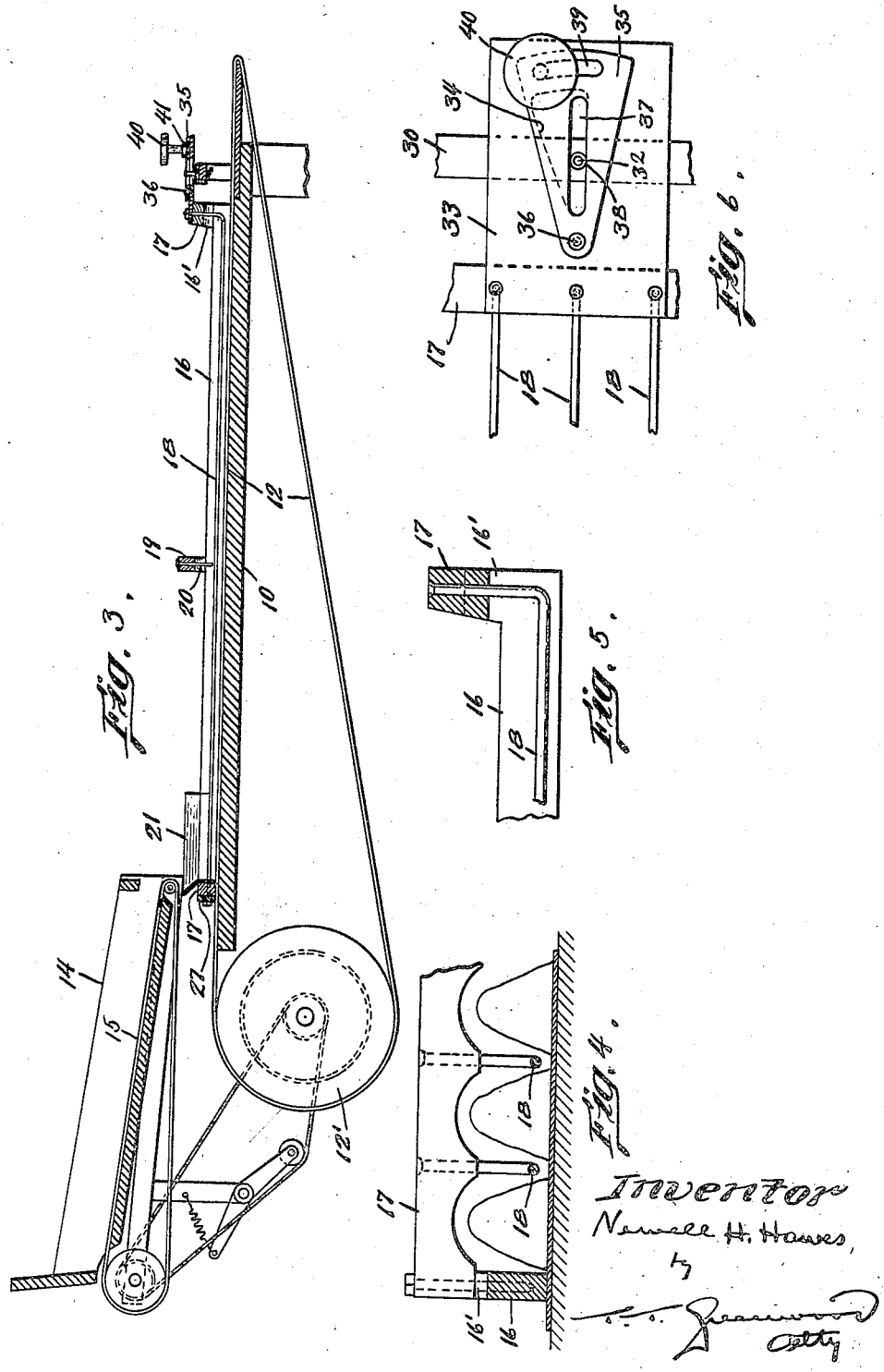

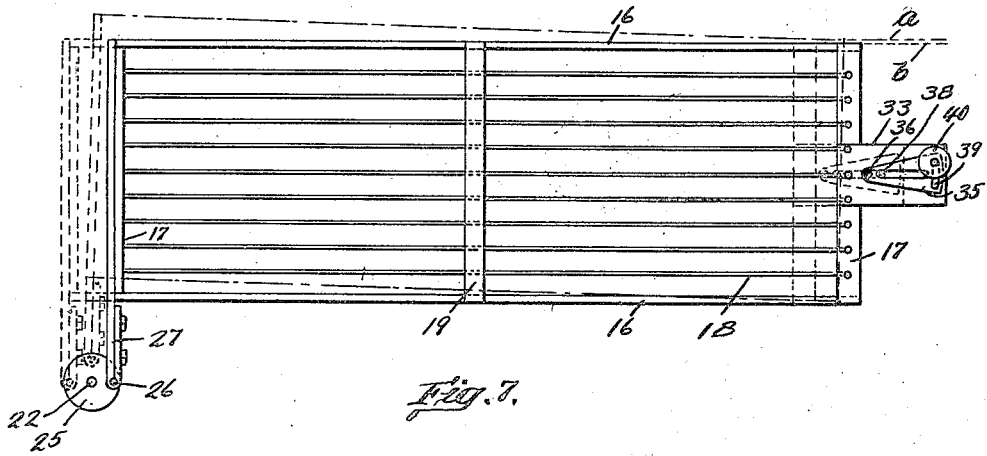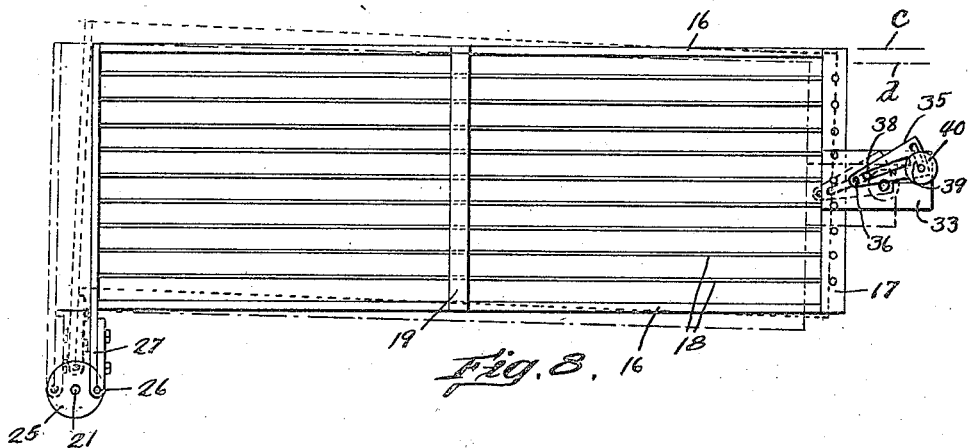

1,459,367

UNITED STATES PATENT OFFICE.

NEWELL H. HAWES, OF ARLINGTON, MASSACHUSETTS, ASSIGNOR TO WM. F. SCHRAFFT & SONS, CORPORATION, OF BOSTON, MASSACHUSETTS, A CORPORATION OF MASSACHUSETTS.

ARTICLE-FEEDING DEVICE.

Application filed February 13, 1920. Serial No. 358,483.

*To all whom it may concern:*

Be it known that I, NEWELL H. HAWES, a citizen of the United States, residing at Arlington, in the county of Middlesex and State of Massachusetts, have invented an Improvement in Article-Feeding Devices, of which the following is a specification.

My present invention relates to an article assorting and feeding machine particularly adapted to receive a supply of candy centers in promiscuous order and arrange them in upright position in orderly rows on a movable conveyor for delivery to a confectionery enrobing machine.

Such a machine usually comprises, as the means by which the candy centers are arranged in upright position in orderly rows on a conveyor or belt, a grid vertically pivoted at the delivery end of the machine, adapted to be laterally reciprocated over the conveyor belt; the arrangement being such that the end of the grid in which the candy centers are promiscuously received has the maximum lateral reciprocatory movement and the pivoted end has the least lateral reciprocatory movement.

The machine, so constructed and arranged, while it may operate satisfactorily to arrange in orderly rows candy centers having a more or less circular base and varying but slightly in size or shape, does not satisfactorily arrange in orderly rows centers having unique shapes, nor will it handle a great variety of shapes and sizes.

The object of my invention is to provide an article feeding device especially adapted to be associated with an enrobing machine arranged to receive and align in orderly rows on a moving conveyor belt a great variety of shapes and sizes of candy centers, and unique shapes of centers; and that admits of adjustment for various sizes and shapes of centers whereby the above result may be attained; and that is of improved design and construction.

I accomplish the object of my invention by imparting a simultaneous lateral and longitudinal reciprocatory motion to the grid as an entirety, whereby the centers will be rotated as they are carried forward on the moving belt thereby the more quickly to assume a proper position on the belt; and I provide for adjustment of the extent of lateral movement of that end of the grid nearest the enrobing machine, whereby to adjust the machine properly to align centers of various shapes and sizes in orderly rows; and, ordinarily, the larger the center, the less will be the lateral movement of that end of the grid, and vice versa.

Fig. 1 is a side elevation of an article feeding device embodying my invention associated with a candy enrobing machine.

Fig. 2 is a plan view of the machine of Fig. 1.

Fig. 3 is a sectional detail along line 3—3 of Fig. 2.

Figs. 4 and 5 are details of the grid construction.

Fig. 6 is an enlarged plan detail of means for adjusting the extent of the lateral movement of the delivery end of the grid.

Fig. 7 is a plan detail of the grid arranged for minimum lateral movement.

Fig. 8 is a plan detail of the grid arranged for maximum lateral movement.

As here shown the feeding end of the enrobing machine includes the suitably supported bed 10 of substantial length extended toward and terminating in proximity to the enrobing machine, a fragmentary portion of which is illustrated by 11. An endless conveyor belt 12 is movably supported upon the top surface of the bed and is passed over the edge thereof at the delivery end of the device and the driving drum 12' by which it is moved at suitable speed. Said drum is suitably driven from the driving shaft 13.

A hopper 14 is supported at and above the end of said bed 10 and is adapted to receive the uncoated centers in promiscuous order. A relatively short movable belt 15 is supported upon the bottom of said hopper and occupies substantially the entire width thereof. Said belt serves to convey the centers at the proper speed from the hopper into a grid supported on the conveyor belt 12.

The usual practice is to pour the centers in promiscuous order into the hopper at the back end thereof, and the machine attendant spreads them more or less evenly over the belt 15. The speed of both belts is so adjusted that the maximum cooperative result is attained.

The grid by which the centers are arranged upright in orderly rows on said conveyor belt includes the frame formed of the outer rigid longitudinal bars 16 and end connecting bars 17 secured together to form a rigid structure adapted to rest upon and be reciprocated over the surface of said conveyor belt 12. The ends of said longitudinal bars 16 are formed with vertically-elevated portions 16' at the delivery end of the grid and an end connecting bar 17 is secured to such elevated portions whereby to provide for the passage of the centers therebeneath. A plurality of parallel spaced-apart rods 18 are extended along the length of the grid within said outer longitudinal bars 16 and the ends thereof are fixed to the end of bars 17 of the grid, the end portions adjacent the delivery end of the device being reflexed upward at substantially right angles for this purpose. Said rods 18 are so secured in the grid structure as to be supported above the surface of the conveyor belt, although in proximity thereto.

A cross bar 19 is secured to the longitudinal bars 16 at about the middle of the grid and is supported thereabove a suitable distance to permit the passage therebeneath of the centers to be coated. A plurality of pins 20 are secured to and depend from the underside of said bar in vertical alignment with said rods 18 and terminate adjacent thereto whereby to aid in aligning the centers.

The feed-in end of the grid is provided with the upwardly extended and outwardly flaring side walls 21 which form in effect a hopper to retain therein the centers as they are transferred from the hopper by its belt 15.

The delivery end of the grid is supported by means hereinafter to be described and the feed-in end of the grid is arranged for connection with driving means by which it is laterally and longitudinally reciprocated.

The means by which the feed-in end of the grid is laterally and longitudinally reciprocated comprises the shaft 22 vertically supported in bearings carried by the frame of the device and driven through the bevel gears 23 and change-speed mechanism 24 from the power shaft 13. An interposed clutch-mechanism is provided by which the grid, and also the conveyor belts, may be operatively disconnected from said shaft.

A disc 25 is fixed to the support of said vertical shaft 22 and a crank-pin 26 is received therein. An arm 27 is secured to an end bar 17 of said grid and rigidly extends laterally therefrom beyond the bed of the machine, and said crank-pin 26 is journalled therein. Obviously, as said shaft 22 is rotated, the grid is moved simultaneously longitudinally and laterally, and the extreme positions of the grid is clearly indicated in Figs. 7 and 8.

Said disc 25 may be provided with a plurality of pin receiving recesses 28 therein spaced at various distances from the center of the disc in any of which said pin 27 may be received whereby the grid may be adjusted for various degrees of lateral and longitudinal movement.

The means by which delivery end of the grid has imparted thereto a combined lateral and longitudinal reciprocatory movement, with provision for adjustment of the extent of lateral movement includes the grid-supporting bar 30 extended transversely across the conveyor belt 12 at the delivery end of the bed 10 and supported thereabove sufficiently high to admit of the passage therebeneath of the aligned centers.

A bearing plate 31 is secured to the upper face of said bar at approximately the middle portion thereof and a pin 32 is secured thereto extending upwardly thereabove. A plate 33 is fixed to the cross bar 17 of the grid and extends over said stationary plate 31 and is formed with the triangular shaped aperture 34 therein through which said pin 32 is extended. Said aperture is of sufficient length to permit the extreme longitudinal movement of the grid without interference. A triangular shaped cam plate 35 is pivoted at 36 to the upper face of said plate 33 and supported thereon over the opening therein, said cam plate being formed with an elongated cam slot 37 therein having parallel side walls in which said pin 32 is received. A roller 38 is rotatably mounted on said pin and adapted to engage the side walls of said plate 35 as the grid is reciprocated thereby to guide its movement. Said plate 35 is also provided with an arcuate slot therein and a clamping screw 40 having a clamping shoulder 41 is extended through said slot and is threaded in the plate 33 whereby to clamp the cam plate in any adjusted position.

In the operation of the device, when the cam plate 35 is so set that the cam slot 37 therein is in line with the direction of movement of the conveyor belt, or in line with the direction of longitudinal movement of the grid the movement of the delivery end of the grid will be mainly longitudinal and the amount of transverse movement will be relatively small, as illustrated by the parallel dotted lines $a$ and $b$ in Fig. 7.

When, however, said cam plate 35 is so moved about its pivot that the slot 37 therein is at an inclination to the direction of longitudinal movement of the grid, the reciprocation of the grid will cause the delivery end thereof to be moved laterally as well as longitudinally and the amount of movement may be made relatively great by suitably adjusting the inclination of the cam slot. The extent of the movement with the device set for lateral movement is illustrated by the distance between the parallel dotted lines c and d, Fig. 8.

In the practical operation of a machine embodying this invention, when it is desired to coat centers having a relatively great diameter or which are relatively large in size, the grid ordinarily will be adjusted so as to have but a relatively small amount of lateral movement. For relatively small pieces, however, the grid will be adjusted to have a relatively great extent of lateral movement. The action of the combined lateral and longitudinal movements of the grid is to cause the centers to be rotated, by engagement with the rods 18 first on one side and then on the other thereof while being moved forward by the conveyor belt so that the pieces are relatively quickly moved into position.

By the provision of means which admits of the lateral movement of the delivery end of the grid, the effect of a pivoted grid of much greater length results whereby a grid having provision for lateral movement at its discharge end may be made relatively shorter than a pivoted grid, for the same work, thereby shortening the machine and decreasing the cost thereof.

It is obvious that modified forms of my invention may be constructed without departing from the spirit thereof.

I claim:

1. An article feeding device comprising a conveyor belt adapted to support a plurality of articles, a grid arranged for combined lateral and longitudinal reciprocatory movement above said belt and arranged to engage the articles on the belt and displace them on said belt and also rotate them into orderly rows on the belt, and means to reciprocate said grid both laterally and at the same time longitudinally above said belt.

2. An article feeding device comprising a conveyor belt, a laterally and longitudinally reciprocable grid supported thereabove adapted to receive the articles to arrange them in orderly rows thereon and means to vary the extent of lateral reciprocation of said grid.

3. An article feeding device comprising a conveyor belt, a laterally and longitudinally reciprocable grid supported thereabove adapted to receive the articles to arrange them in orderly rows thereon and means to vary the extent of longitudinal reciprocation of said grid.

4. An article feeding device comprising a conveyor belt, a laterally and longitudinally reciprocable grid supported thereabove adapted to receive the articles to arrange them in orderly rows thereon and means to vary the extent of lateral and longitudinal reciprocation of said grid.

5. An article feeding device comprising a conveyor belt, a grid supported above said belt having means associated with one end of it which admits of its being simultaneously laterally and longitudinally reciprocated and means associated with the other end of said grid adapted to guide that end thereof for combined longitudinal and lateral motion.

6. An article feeding device comprising a conveyor belt adapted to support a plurality of articles, a grid arranged for combined lateral and longitudinal reciprocatory movement above said belt and arranged to engage the articles on the belt and displace them on said belt and also rotate them into orderly rows on the belt, and means associated with the opposite ends of said grid arranged to guide said grid for combined lateral and longitudinal reciprocating movement.

7. An article feeding device comprising a conveyor belt, a grid supported thereabove and in proximity thereto and means to guide the ends of said grid for combined lateral and longitudinal reciprocatory movement of variable extent.

8. An article feeding device comprising a conveyor belt, a grid supported thereabove, means to simultaneously laterally and longitudinally reciprocate one end of said grid and means to guide the other end of said grid for simultaneous lateral and longitudinal reciprocatory movement of lesser degree.

9. An article feeding device comprising a conveyor belt, a grid supported thereabove, means to simultaneously laterally and longitudinally reciprocate one end of said grid and means to guide the other end of said grid for combined lateral and longitudinal reciprocatory movement having provision for varying the extent of lateral reciprocatory movement.

10. An article feeding device comprising a conveyor belt, a grid supported thereabove, means to simultaneously laterally and longitudinally reciprocate one end of said grid having provision for varying the extent of lateral and longitudinal reciprocation and means to guide the other end of said grid for combined lateral and longitudinal reciprocatory movement having provision for varying the extent of lateral reciprocatory movement.

11. An article feeding device comprising a conveyor belt, a grid supported thereabove having a plurality of longitudinally aligned spaced-apart rods adapted to receive a plurality of articles in promiscuous order and arrange them in orderly rows on said belt, means to simultaneously and laterally reciprocate one end of said grid and means to guide the other end of said grid for combined lateral and longitudinal reciprocatory movement having provision for varying the extent of lateral reciprocatory movement.

12. An article feeding device comprising a conveyor belt, a grid supported thereabove, a rotatable shaft, means connecting one end of said grid with said shaft whereby to simultaneosly laterally and longitudinally reciprocate that end of said grid and means arranged to guide the other end of said grid for simultaneous lateral and reciprocatory movement.

13. An article feeding device comprising a movable conveyor belt, a grid supported thereabove, a rotatable shaft and rigid means eccentrically connecting said shaft with one end of said grid whereby to impart a simultaneous lateral and longitudinal reciprocatory movement thereto and means arranged to guide the other end of said grid for simultaneous lateral and reciprocatory movement.

14. An article feeding device comprising a conveyor belt, a grid supported thereabove, a rotatable shaft having eccentric connecting means, said grid having a member rigidly extended from one end thereof operably connected with said eccentric connecting means whereby that end of the grid will be laterally and longitudinally reciprocated and means to guide the other end of the grid for combined lateral and longitudinal reciprocatory movement.

15. An article feeding device comprising a conveyor belt, a grid supported thereabove, a rotatable shaft, having a disc at its end formed with a plurality of pin-receiving recesses therein arranged at varying distances from its center, a pin received removably in one of said recesses, a member rigidly extended from one end of said grid operably connected with said pin whereby that end of the grid will be laterally and longitudinally reciprocated and the extent of such reciprocation admits of adjustment and means to guide the other end of said grid for combined lateral and reciprocatory movement.

16. An article feeding device comprising a conveyor belt, a grid supported thereabove, means applied at one end of said grid to longitudinally reciprocate said grid and means arranged to guide the other end of said grid for simultaneous lateral reciprocatory movement.

17. An article feeding device comprising a conveyor belt, a grid supported thereabove, means applied at one end of said grid to longitudinally reciprocate said grid and means arranged to guide the other end of said grid for simultaneous lateral reciprocatory movement, said means having provision for adjusting the extent of such lateral reciprocatory movement.

18. An article feeding device comprsing a conveyor belt, a grid supported thereabove, means applied at one end of said grid to longitudinally reciprocate said grid and means arranged to guide the other end of said grid for simultaneous lateral reciprocatory movement, said means comprising a member inclined to the direction of longitudinal movement of the grid and a stationarily supported member engageable with said inclined member.

19. An article feeding device comprising a conveyor belt, a grid supported thereabove, means applied at one end thereof to impart longitudinal reciprocatory movement thereto, and means to guide the other end of said grid for combined lateral and longitudinal reciprocatory movement, said means comprising a stationarily supported pin and a cam plate carried by said grid, said cam plate having a cam slot therein inclined to the direction of longitudinal movement of said grid in which said pin is received.

20. An article feeding device comprising a conveyor belt, a grid supported thereabove, means applied at one end thereof to impart longitudinal reciprocatory movement thereto and means to guide the other end of said grid for combined lateral and longitudinal reciprocatory movement, said means comprising a stationarily supported pin and an angularly adjustable cam plate having a cam slot therein in which said pin is received carried by said grid.

21. An article feeding device comprising a conveyor belt, a grid supported thereabove, means applied at one end thereof to impart longitudinal reciprocatory movement thereto and means to guide the other end of said grid for combined lateral and longitudinal reciprocatory movement, said means comprising a stationarily supported pin and a cam plate carried by said grid having a cam slot therein in which said pin is received also having means to vary the inclination of said slot and means to lock said plate in any set position.

22. An article feeding device comprising a conveyor belt, a grid supported thereabove, means applied at one end of said grid to reciprocate it longitudinally, a cam plate supported by said grid having a cam slot therein said plate having means to vary its position whereby to vary the inclination of the slot to the direction of reciprocatory movement of the grid, means to clamp said plate in adjusted position and a stationarily supported guide pin received in said cam slot.

23. An article feeding device comprising a conveyor belt, a grid supported thereabove, means applied at one end of said grid to reciprocate it longitudinally, a plate having an aperture therein carried by said grid at its other end, a stationarily supported guide pin extended through said aperture, a cam plate having a cam slot therein pivoted to said plate, said pin received in said slot and engageable with the side walls thereof and means to clamp said cam plate in adjusted position.

24. In an article feeding device, a grid having longitudinal side members, a plurality of longitudinally arranged spaced-apart members arranged between said longitudinal members and a bar supported above said spaced-apart members having portions vertically positioned above and depending into proximity with said spaced-apart members.

25. An article feeding device comprising a bed, a conveyor belt movable thereover, a grid having a plurality of longitudinally arranged spaced-apart members supported thereabove, means to simultaneously laterally and longitudinally reciprocate one end of said grid, means arranged to guide the other end of said grid for combined lateral and longitudinal reciprocatory movement having provision for adjustment of the extent of lateral reciprocatory movement, an article receiving hopper having a movable belt arranged to deliver articles in promiscuous order to said grid for arrangement in orderly rows on said conveyor belt, and means to operate said belts and grid.

In testimony whereof, I have signed my name to this specification.

NEWELL H. HAWES.